(12) United States Patent
Guo et al.

(10) Patent No.: US 11,709,106 B2
(45) Date of Patent: Jul. 25, 2023

(54) ROLLER BEARING, WIND TURBINE AND METHOD FOR CONTROLLING SAME

(71) Applicants: AKTIEBOLAGET SKF, Gothenburg (SE); SKF (China) Co Ltd, Shanghai (CN)

(72) Inventors: Mingchun Guo, Shanghai (CN); Quan Xu, Shanghai (CN); Robert Zeillinger, Steyr (AT); Lichao Zhang, Shanghai (CN)

(73) Assignees: AKTIEBOLAGET SKF, Gothenburg (SE); SKF (CHINA) CO LTD., Shanghai (CN)

( * ) Notice: Subject to any disclaimer, the term of this patent is extended or adjusted under 35 U.S.C. 154(b) by 319 days.

(21) Appl. No.: 16/835,799

(22) Filed: Mar. 31, 2020

(65) Prior Publication Data

US 2020/0326251 A1 Oct. 15, 2020

(30) Foreign Application Priority Data

Apr. 11, 2019 (CN) .......................... 201910288865.5

(51) Int. Cl.
*G01L 5/00* (2006.01)
*F03D 80/70* (2016.01)
(Continued)

(52) U.S. Cl.
CPC .......... *G01L 5/0009* (2013.01); *F03D 7/0224* (2013.01); *F03D 80/70* (2016.05); *F16C 19/386* (2013.01); *F16C 19/522* (2013.01); *F16C 33/586* (2013.01); *G01L 1/246* (2013.01); *F16C 2233/00* (2013.01)

(58) Field of Classification Search
CPC .... F16C 19/386; F16C 19/522; F16C 33/586; F16C 41/00; F16C 2233/00; G01L 1/246; G01L 5/0009; F03D 80/70
See application file for complete search history.

(56) References Cited

U.S. PATENT DOCUMENTS

| 4,341,122 A | * | 7/1982 | Lechler | ................. | G01M 13/04 |
| | | | | | 73/862.045 |
| 2013/0188897 A1 | * | 7/2013 | Reedman | .............. | G01L 5/0009 |
| | | | | | 384/445 |

(Continued)

FOREIGN PATENT DOCUMENTS

| DE | 102011077495 A1 | 12/2012 | | |
| DE | 102014213834 B4 | * 3/2016 | ............. | B62M 6/50 |

(Continued)

OTHER PUBLICATIONS

Machine Translation of DE-102014213834-B4 (Year: 2016).*

(Continued)

*Primary Examiner* — Alan B Waits
(74) *Attorney, Agent, or Firm* — J-Tek Law PLLC; Scott T. Wakeman; Mark A. Ussai

(57) ABSTRACT

A roller bearing includes an outer ring, an inner ring, at least one row of rollers arranged between the outer ring and the inner ring, and at least one optical fiber cable mounted to the outer ring or the inner ring, the optical fiber cable including at least one Bragg grating. The optical fiber cable is configured such that a signal in the optical fiber cable is usable to determine a preload or load on the roller bearing.

18 Claims, 2 Drawing Sheets

(51) Int. Cl.
*F16C 19/38* (2006.01)
*F16C 33/58* (2006.01)
*F03D 7/02* (2006.01)
*G01L 1/24* (2006.01)
*F16C 19/52* (2006.01)

(56) References Cited

U.S. PATENT DOCUMENTS

2015/0323013 A1* 11/2015 Herdier .................... G01L 1/242
384/448
2016/0123304 A1* 5/2016 Kibsgaard .............. G05B 15/02
700/287
2017/0321746 A1* 11/2017 Yang ..................... F16C 33/586

FOREIGN PATENT DOCUMENTS

| | | |
|---|---|---|
| DE | 102015208444 A1 | 12/2016 |
| DE | 102017217813 A1 | 4/2019 |
| FR | 2961871 A1 * 12/2011 | ............. G01L 1/242 |
| GB | 2514845 A | 12/2014 |
| WO | 2011066926 A1 | 6/2011 |
| WO | 2011066927 A1 | 6/2011 |
| WO | 2011066928 A1 | 6/2011 |
| WO | 2013186256 A1 | 12/2013 |
| WO | 2013186258 A1 | 12/2013 |
| WO | 2013186354 A1 | 12/2013 |
| WO | 2014090309 A1 | 6/2014 |
| WO | 2014090315 A1 | 6/2014 |
| WO | 2014090332 A1 | 6/2014 |
| WO | 2015090359 A1 | 6/2015 |
| WO | 2015180891 A1 | 12/2015 |
| WO | 2016096031 A1 | 6/2016 |

OTHER PUBLICATIONS

Machine Translation of FR-2961871-A1 (Year: 2011).*
European Search Report from the European Patent Office dated Sep. 1, 2020 in related application No. EP 20 16 7520, including European Search Opinion.

* cited by examiner

ROLLER BEARING, WIND TURBINE AND METHOD FOR CONTROLLING SAME

CROSS-REFERENCE

This application claims priority to Chinese patent application no. 201910288865.5 filed on Apr. 11, 2019, the contents of which are fully incorporated herein by reference.

TECHNOLOGICAL FIELD

The present disclosure is directed to a roller bearing, particularly a large double-row tapered roller bearing for a wind turbine (or wind generator) and to a wind turbine and a method for controlling the wind turbine.

BACKGROUND

Wind turbines typically employ preloaded (or pre-tightened) large double-row tapered roller bearings which typically have an outer ring with a diameter of at least 1 meter. The size of the bearings involved is significantly larger than that of bearings with a diameter of a few centimeters used in, for example, vehicles. For such a large bearing, it is important and difficult to determine a preload during its installation. In addition, during the operation of the roller bearing, large and unknown deformations often occur. For example, because of not being supported by a sufficiently rigid structure, the bearing may be subjected to a severe deformation under a load, which may impair the performance, and therefore, it is equally important to determine the load on the roller bearing during operation.

Using a conventional method preload/load is determined by measuring friction torque. However, the method is not very effective for such a large sized bearing, and also leads to an inaccurate measurement. Therefore, there exists a need for a roller bearing that can easily measure a preload/load condition.

SUMMARY

The present disclosure overcomes the above-mentioned technical problems and provides a roller bearing that can easily measure a preload/load on the bearing.

One aspect of the present disclosure relates to a roller bearing, which comprises an outer ring, an inner ring, and at least one row of rollers arranged between the outer ring and the inner ring, wherein the outer ring or the inner ring is provided with an optical fiber cable, the optical fiber cable comprising at least one Bragg grating, and a signal in the optical fiber cable being used to determine a preload or load on the roller bearing.

With the optical fiber cable having the Bragg grating, the present disclosure enables the roller bearing to easily measure the preload or a load thereon, so that references are provided for subsequent work (such as designing bearings, controlling wind turbines).

Advantageously, the preload or load is determined during installation of the roller bearing and/or during operation of the roller bearing for determining the load condition of the roller bearing under external influences, particularly circumferential load profile.

Advantageously, the preload or load is monitored such that an alarm is sent when the preload or load deviates from a predetermined normal condition. The preload or load may be monitored by a condition monitoring system, so that the magnitude of the preload/load can be obtained in real time during installation and operation, in order to adjust the installation and operating status of the bearing in time according to measurements. A large amount of monitoring data may also be used to provide useful references for bearing design.

Advantageously, the roller bearing, particularly the outer ring of the roller bearing, is provided with a plurality of recesses, and each of the recesses respectively accommodates an independent optical fiber cable for measuring the circumferential load profile. Further, the recess itself may extend circumferentially and the recesses are arranged in an axial direction. By providing multiple optical fiber cables, it is possible to more comprehensively obtain changes of circumferential strain in the axial direction.

Advantageously, the outer ring and/or the inner ring is a split (such as double-row) outer ring and/or inner ring having the recess for accommodating the optical fiber cable. The split outer ring and/or inner ring facilitate manufacturing, transportation and installation.

Advantageously, the optical fiber cable further comprises at least one temperature measurement line for measuring the temperature of the at least one Bragg grating. By providing the temperature measurement line, a strain measurement can be compensated in terms of temperature to further improve the measurement precision of the preload/load.

Advantageously, the roller bearing further comprises a control and storage unit configured to measure and store the load profile if temperature, vibration or speed exceeds a threshold range, and to measure and store at least one of the temperature, the vibration, the speed, and the load. Thereby the influences of various parameters on the strain can be better obtained and an adjustment to the bearing is made if necessary.

Advantageously, the roller bearing is a double-row tapered roller bearing, particularly a double-row tapered roller bearing in an X arrangement having two outer rings, each of which is provided with the optical fiber cable.

Advantageously, an outer periphery of the outer ring corresponding to a loaded zone of each row of rollers is provided with: a groove, the groove having a cross section in the shape of an isosceles trapezoid, wherein the isosceles trapezoid forming the groove has an upper base located on a radially outer side of the outer ring, a lower base located on a radially inner side of the outer ring, and a base angle greater than or equal to 70 degrees and less than or equal to 85 degrees; and a cover, the cover having a cross section in the shape of a rectangle, wherein the rectangle forming the cover has a width greater than or equal to the length of the upper base of the isosceles trapezoid, and a height greater than the difference between the height of the isosceles trapezoid and the diameter of the optical fiber cable, and the cover is inserted into the groove to cover the groove; wherein one optical fiber cable is accommodated inside a space enclosed by each side and the lower base of each isosceles trapezoid forming the groove and the cover.

Advantageously, the height of the cover may be equal to the height of the isosceles trapezoid.

Advantageously, the cover may be a seal ring.

Advantageously, the lower base may have a length less than or equal to the length of the roller in the axial direction and greater than or equal to half the length of the roller in the axial direction.

Advantageously, an axial distance between an end of the lower base and an end of the roller may be less than or equal to 10% of the length of the roller in the axial direction.

Advantageously, both the groove and the cover may extend circumferentially over the entire circumference of the outer ring.

Advantageously, an arc-shaped recessed portion (or recess) fitting the bottom of the optical fiber cable may be provided at a position in the lower base where the optical fiber cable is arranged.

Advantageously, the lower base may be located radially outside of a bolt hole for fixing the outer ring.

Another aspect of the present disclosure relates to a wind turbine comprising a roller bearing according to any one of the preceding technical solutions.

Still another aspect of the present disclosure relates to a method for controlling the wind turbine according to any one of the preceding technical solutions. Blades of the wind turbine may be brought into a pitch out status to reduce the force acting on the roller bearing if the preload or load measured by the optical fiber cable exceeds a predetermined threshold. This can effectively protect the bearing and increase the service life of the bearing.

By providing an optical fiber cable with a Bragg grating, the roller bearing can easily measure the preload/load, such that useful references are provided for equipment installation, operation control, and bearing design so as to allow the roller bearing to adequately deliver its performance and to increase the service life of the bearing.

A large space around each optical fiber cable provides easier arrangement, installation, and replacement of the optical fiber cable (although replacements rarely occur). The present disclosure has a simple structure and a low implementation cost. In addition, the optical fiber cable can be securely prevented from moving by means of the blocking of the cover in the case of failure in the fixing of the optical fiber cable itself.

By using a plurality of optical fiber cables for measuring in loaded roller zones on the double-row tapered rollers of the present disclosure, it is possible to more comprehensively monitor the changes in load in the loaded zones, which is conducive to a more comprehensive analysis of the relationship between the load on the rollers and various factors (such as the environment), which in turn improves bearing design.

Further advantages and advantageous embodiments are described in detail in the description, the accompanying drawings and the claims. The combination of the features particularly described in detail in the description and the accompanying drawings herein is purely exemplary, such that these features can also exist alone or be combined in other ways.

BRIEF DESCRIPTION OF THE DRAWINGS

The present invention is described in more detail hereinafter based on the exemplary embodiments depicted in the accompanying drawings. The exemplary embodiments and the combinations shown in the exemplary embodiments herein are purely exemplary, and are not intended to limit the scope of the present invention. The scope of the present invention is limited only by the pending claims. Some features in the accompanying drawings may be exaggerated for clarity.

DETAILED DESCRIPTION

The present disclosure relates to a roller bearing, comprising an outer ring 1, an inner ring 2, and at least one row of rollers 3 arranged between the outer ring 1 and the inner ring 2. The outer ring 1 or the inner ring 2 is provided with an optical fiber cable 6 that includes at least one Bragg grating, and a signal in the optical fiber cable 6 is used to determine a preload or load on the roller bearing. Thereby, by virtue of the optical fiber cable 6 having the Bragg grating, the preload can be determined during installation of the roller bearing, and the load can be determined during operation of the roller bearing for determining the load profile condition of the roller bearing under external influences, particularly circumferential load profile. The load profile under external influences can be calculated by subtracting the preload from an overall load.

A control and storage unit may further be provided for calculation and analysis of detected strains, particularly strains in a circumferential direction, so as to provide references for the design, installation and operation of large bearings such as those used in wind turbines. In addition, a monitoring mechanism and an actuator may further be provided to form an automatic control system. For example, the monitoring mechanism monitors the preload or load and sends an alarm to alert a worker when the preload or load deviates from a predetermined normal condition. As an alternative, blades of the wind turbine may be brought into a pitch out status (which is achieved, for example, by adjusting the angle of the blades of the wind turbine) to reduce the force acting on the roller bearing if the preload or load measured by the optical fiber cable exceeds a predetermined threshold. This can effectively protect the bearing and increase the service life of the bearing.

In addition to measuring strains, the optical fiber cable 6 having the Bragg grating can also measure: pressure, temperature, acceleration, and displacement, specifically, for example, the temperature, vibration, speed, and load measurement of the bearing.

To this end, the optical fiber cable 6 is fixed to the roller bearing. Roller bearings as described herein may include tapered roller bearings, spherical roller bearings and cylindrical roller bearings. According to an embodiment, the outer ring 1 is provided with a plurality of recesses, and each of the recesses respectively accommodates an independent optical fiber cable 6 for measuring the circumferential load profile.

Figure 1:
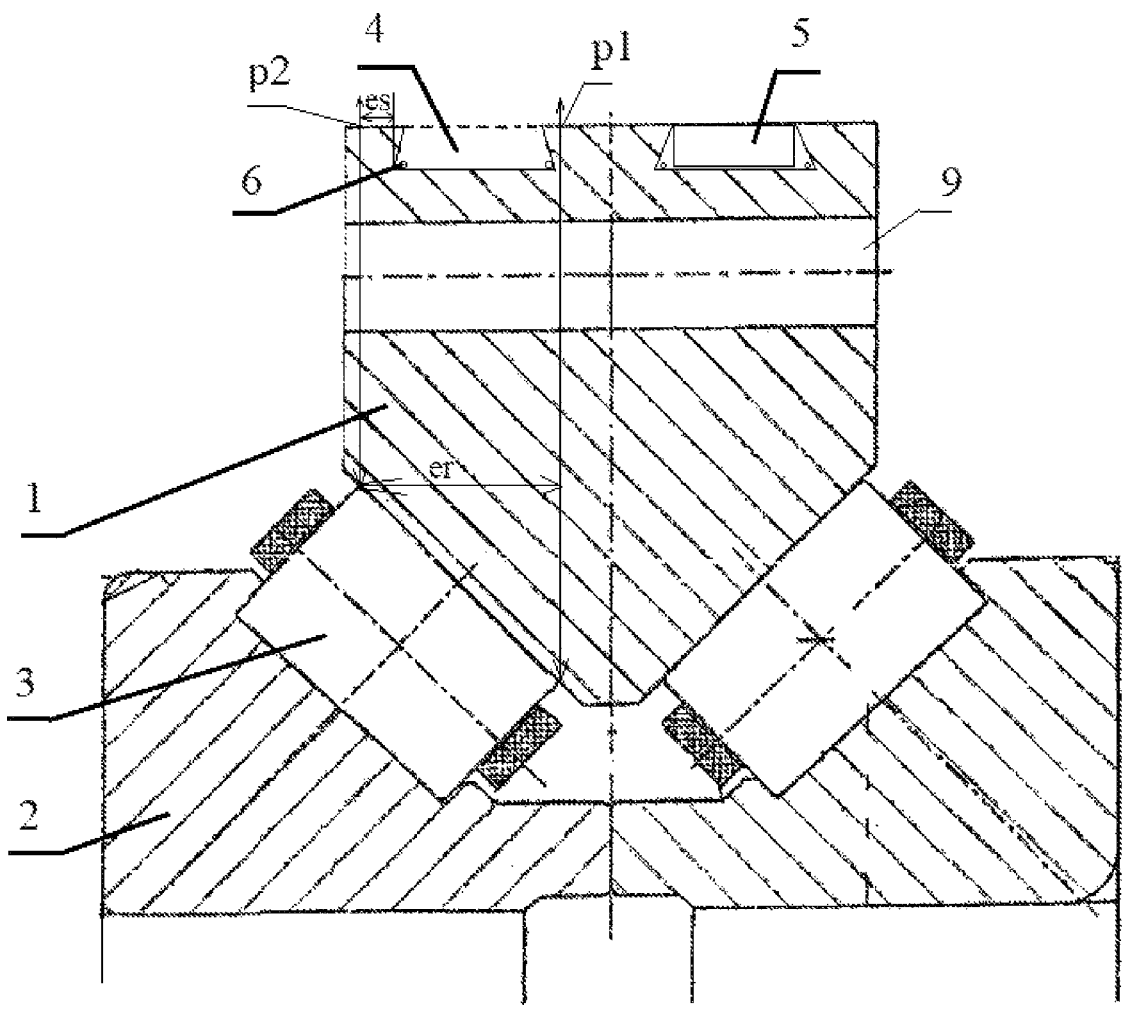
FIG. 1 is a schematic cross-sectional view of a double-row tapered roller bearing according to an embodiment.

FIG. 1 shows a double-row tapered roller bearing according to an embodiment, which is a double-row tapered roller bearing in an X arrangement having two outer rings and is commonly used in a wind turbine (or wind generator). The "X arrangement" in the industry refers to a TDO or back-to-back form. A double-row arranged tapered roller bearing can support axial loads in two directions. In typical cases, the double-row tapered roller bearing can adopt both a back-to-back arrangement and a face-to-face arrangement. In the back-to-back arrangement, double rows of tapered rollers face each other with end faces of smaller ends, and guide ribs for bearing the axial loads are located on two axial sides of double rows of inner rings abutting against each other, respectively. In the face-to-face arrangement, the double rows of tapered rollers face each other with end faces of larger ends, and the guide ribs for bearing the axial loads are located on axially inner sides abutting against each other of the double rows of inner rings. The inner rings of the double-row tapered roller bearing that abut against each other can further be integrated to form a double-row tapered roller bearing in the face-to-face arrangement having an integrated inner ring structure.

As shown in FIG. 1, the double-row tapered roller bearing comprises: an outer ring 1, an inner ring 2, and two rows of rollers 3 arranged between the outer ring 1 and the inner ring 2. A groove 4 and a cover 5 are provided at an outer periphery of the outer ring 1 corresponding to a loaded zone of each row of rollers. Here, "the outer periphery of the outer ring corresponding to a loaded zone of each row of rollers" can be understood as a projection area of the rollers on a radially outer surface of the outer ring of the bearing, that is, the area between points p1 and p2 on the outer ring 1 in FIG. 1. "Loaded zone" refers to an area where the rollers directly interact with the outer ring 1/inner ring 2.

The groove 4 has a cross section in the shape of an isosceles trapezoid, wherein the isosceles trapezoid forming the groove 4 has an upper base located on a radially outer side of the outer ring 1, a lower base located on a radially inner side of the outer ring 1, and a base angle greater than or equal to 70 degrees and less than or equal to 85 degrees. Here, "the groove has a cross section in the shape of an isosceles trapezoid" means that the groove has an isosceles trapezoidal shape in an axial cross section. "The isosceles trapezoid has an upper base located on a radially outer side and a lower base located on a radially inner side" is intended to define the orientation of the trapezoidal groove, that is, as shown in FIG. 1, the isosceles trapezoid forming the groove has an opening which is small at an outer edge of the outer ring and gradually enlarges toward the radially inner side. If the base angle α of the isosceles trapezoid is too large, the depth of the groove will increase accordingly to be enough to accommodate the optical fiber cable (i.e., an optical fiber sensor) 6. However, excessive depth may have adverse effects on the installation and replacement of the optical fiber cable 6, and may cause interference with other components (e.g. a bolt hole 9 for fixing). If the base angle α is too small, the space surrounding the optical fiber cable 6 will also become smaller, which is also not conducive to the installation and replacement of the optical fiber cable.

The cover 5 has a cross section in the shape of a rectangle, wherein the rectangle forming the cover 5 has a width cw greater than or equal to the length gub of the upper base of the isosceles trapezoid. Specifically, the width cw of the cover 5 (that is, the length of the cover in an axial direction) may be equal to the length gub of the upper base of the isosceles trapezoid to fit in the groove 4. As an alternative, the width cw of the cover may be slightly greater than the length gub of the upper base of the isosceles trapezoid, such that the cover can be press-fitted into the groove 4 tightly (or with slight interference).

In addition, the cover 5 has a height ch greater than the difference between the height gh of the isosceles trapezoid and the diameter d of the optical fiber cable, that is, ch>(gh−d). The cover 5 is inserted into the groove 4 to cover the groove 4. In other words, the height ch of the cover 5 is designed such that when the cover 5 is placed in the groove 4, the cover 5 can further separate and prevent/block the optical fiber cable 6 from moving. For example, according to an embodiment, the height ch of the cover 5 is designed to be equal to the height gh of the isosceles trapezoid. In this way, the cover 5 can be completely inserted into and fixed in the groove 4 without considering the provision of other arrangements for fixing the cover 5.

It should be noted that the cover 5 may be a seal ring. In this way, the cover 5 can prevent foreign matters from entering the bearing. In addition, with the elasticity of the seal ring itself, the installation and removal of the cover 5 will be easier.

According to the present disclosure, one optical fiber cable 6 is accommodated inside a space enclosed by each side and the lower base of each isosceles trapezoid forming the groove 4 and the cover 5. In other words, as shown in FIGS. 1, 2 and 3, each optical fiber cable 6 is placed between each side and the lower base of each isosceles trapezoid and an auxiliary line ha passing through an end of the upper base in a height direction.

Therefore, in the present disclosure, as shown in FIG. 1, there are four optical fiber cables 6 in total, and one optical fiber cable is arranged in proximity to each end of the loaded zone of each row of rollers. In this way, it is possible to measure the changes in the load near two ends of the loaded zone of each row of rollers. In this way, the load changes and trends of the bearings may be comprehensively monitored throughout the life cycle of a wind generation set so as to provide data references for the design improvement of the bearings and even the system. For example, perfect installation of wind power bearings can be achieved based on preload data; the relationship between the load and the direction and speed of the wind is observed to further improve the design of the bearings; and by means of observing the load, one can know the load profile of the entire nacelle system, thus providing references for the improvement of the structure of a nacelle, especially a bearing seat system.

Both the groove 4 and the cover 5 extend circumferentially over the entire circumference of the outer ring 1. The optical fiber cable 6 is embedded in the outer ring 1 of the bearing. Deformation of the outer ring 1 causes deformation (elongation) of the embedded optical fiber cable. The light passing through the cable is controlled and used as a main signal for conversion into local and global deformation and the load profile. By means of the deformation of the outer ring, the preload on the bearing during installation can be measured more accurately.

Figure 2:
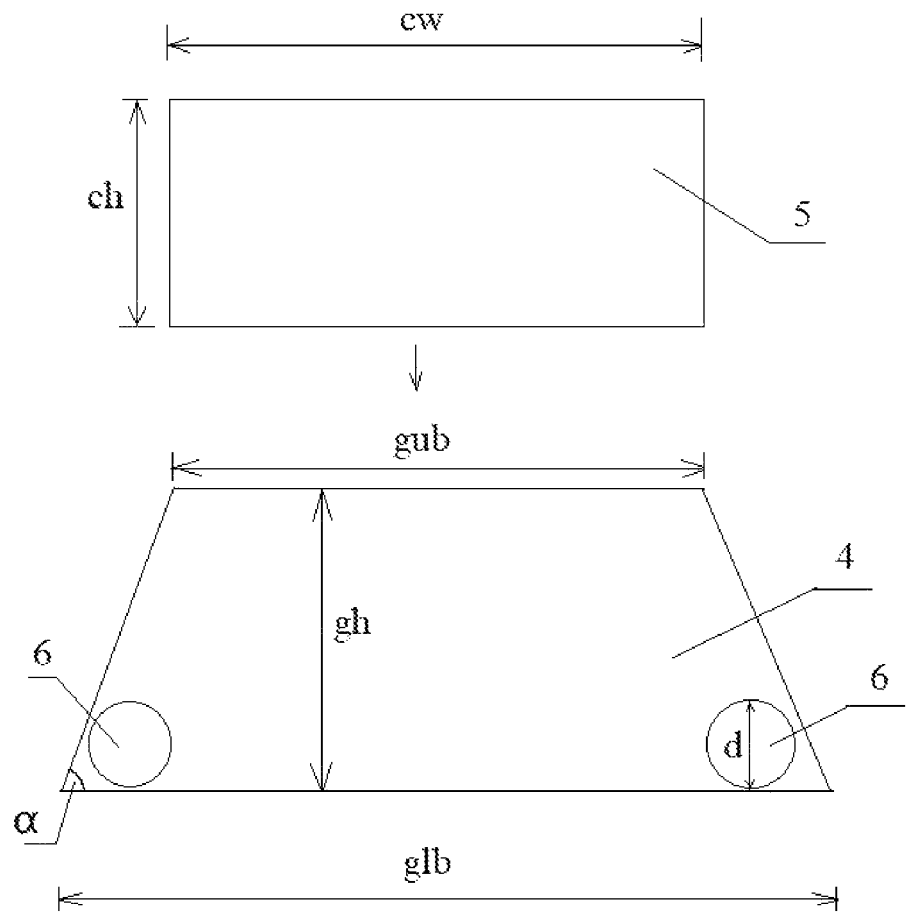
FIG. 2 is a schematic diagram of a groove and a cover on an outer ring of the double-row tapered roller bearing according to FIG. 1 in an unassembled state.
Figure 3:
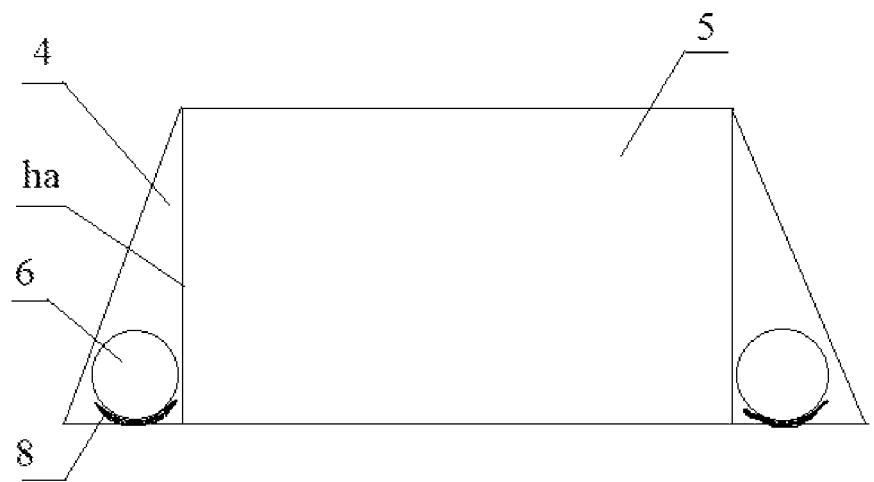
FIG. 3 is a schematic diagram of the groove and the cover on the outer ring of the double-row tapered roller bearing according to FIG. 1 in an assembled state.

As shown in FIGS. 1 and 2, the lower base has a length glb less than or equal to the length of the roller 3 in an axial direction (i.e., the distance between the points p1 and p2) and greater than or equal to half the length of the roller in the axial direction (i.e., half the distance between the points p1 and p2). In other words, the length of the groove 4 in the axial direction is completely contained within the extent of the roller/loaded zone, thus the optical fiber cable will measure the condition in the loaded zone of the roller.

Particularly, according to an embodiment, an axial distance es between an end of the lower base and an end of the roller (which are adjacent to/correspond to each other) is less than or equal to 10% of the length er of the roller 3 in the axial direction. In this way, the optical fiber cable 6 measures the condition in the loaded zone adjacent to both ends of the roller 3. The loads at both ends will be more representative for fully reflecting the load condition of the bearing.

According to an embodiment, as shown in FIG. 3, an arc-shaped recessed portion 8 (or arc-shaped holder) fitting the bottom of the optical fiber cable 6 may be provided at a position in the lower base where the optical fiber cable 6 is arranged. The arc-shaped recessed portion 8 can be prefabricated to make the fixing of the generally circular optical fiber more stable. The arc-shaped recessed portion 8 may not necessarily be completely disposed above the lower base. As an alternative (not shown), the arc-shaped recessed portion 8 may be disposed below the lower base of the isosceles trapezoid (that is, recessed downward from the lower base), or be at least partially disposed below the lower base.

It should also be noted that, in the present application, for the bearings (with a diameter of more than 1 meter) for wind turbines, the depth of the groove is shallow, which makes it easier to install and replace the optical fiber cable, as long as the space formed can accommodate the optical fiber cable. In this way, the groove will not conflict with other components (for example, the bolt hole through the outer ring in the axial direction), that is to say, the groove will not affect and constrain the bearing design.

Representative non-limiting examples of the present disclosure have been described in detail above with reference to the accompanying drawings. The detailed description is only intended to teach a person skilled in the art further details for practicing preferred aspects of the present teachings and is not intended to limit the scope of the present disclosure. Moreover, each of the additional features and teachings disclosed above may be used alone or in combination with other features and teachings.

Furthermore, the above-mentioned representative examples and the various features of the independent and dependent technical solutions may be combined in a way that is not specifically and explicitly enumerated in order to provide further useful embodiments of the present teachings.

LIST OF REFERENCE NUMERALS

1 Outer ring
2 Inner ring
3 Roller
4 Groove
5 Cover
6 Optical fiber cable
8 Arc-shaped recessed portion
9 Bolt hole
p1, p2 Points on outer ring corresponding to loaded zone
es Axial distance between end of lower base and end of roller
er Length of roller in axial direction
gub Upper base of isosceles trapezoid
glb Lower base of isosceles trapezoid
gh Height of isosceles trapezoid
a Base angle of isosceles trapezoid
cw Width of cover
ch Height of cover
d Diameter of optical fiber cable
ha Auxiliary line passing through end of upper base in height direction

What is claimed is:

1. A roller bearing comprising:
an outer ring,
an inner ring,
at least one row of rollers arranged between the outer ring and the inner ring,
and at least one optical fiber cable mounted to the outer ring or the inner ring, the optical fiber cable comprising at least one Bragg grating,
wherein the optical fiber cable is configured such that a signal in the optical fiber cable is usable to determine a preload or load on the roller bearing,
wherein the at least one row of rollers comprises a first row of rollers and a second row of rollers axially spaced from the first row of rollers,
wherein the outer ring includes a first circumferential groove directly radially outward of the first row of rollers and a second circumferential groove axially spaced from the first circumferential groove and directly radially outward of the second row of rollers,
wherein the at least one optical fiber cable comprises a first optical fiber cable in the first circumferential groove and a second optical fiber cable in the second circumferential groove, and
wherein a base of the first circumferential groove has a base width greater than an opening width of the first circumferential groove.

2. The roller bearing according to claim 1, wherein the preload or load is determined during installation of the roller bearing and/or during operation of the roller bearing for determining the load condition of the roller bearing under external influences.

3. The roller bearing according to claim 1, wherein the preload or load is monitored such that an alarm is sent when the preload or load deviates from a predetermined normal condition.

4. The roller bearing according to claim 1, wherein the outer ring is a split outer ring and/or the inner ring is a split inner ring.

5. The roller bearing according to claim 1, including a control and storage unit configured to measure and store a load profile if temperature, vibration or speed exceeds a threshold, and to measure and store at least one of the temperature, the vibration, the speed, and the load.

6. The roller bearing according to claim 1, wherein the roller bearing is a double-row tapered roller bearing in an X arrangement having two outer rings, each outer ring including an optical fiber cable of the plurality of optical fiber cables.

7. A wind turbine including a roller bearing according to claim 1.

8. The roller bearing according to claim 1, wherein a cover is mounted in the first circumferential groove, the cover having a cover width less than the base width such that the cover and the base and a sidewall of the groove define a circumferential passageway, and
wherein the first optical fiber is located in the circumferential passageway.

9. A roller bearing comprising:
an outer ring,
an inner ring,
at least one row of rollers arranged between the outer ring and the inner ring,
and at least one optical fiber cable mounted to the outer ring or the inner ring, the optical fiber cable comprising at least one Bragg grating,
wherein the optical fiber cable is configured such that a signal in the optical fiber cable is usable to determine a preload or load on the roller bearing,
wherein an outer periphery of the outer ring corresponding to a loaded zone of each row of the at least one row of rollers is provided with a groove, the groove having a cross section in the shape of an isosceles trapezoid,
wherein the isosceles trapezoid forming the groove has an upper base located on a radially outer side of the outer ring, a lower base located on a radially inner side of the outer ring, and a base angle ($\alpha$) greater than or equal to 70 degrees and less than or equal to 85 degrees, and
wherein the optical fiber cable is located in the groove.

10. The roller bearing according to claim 9, wherein the lower base has a length (glb) less than or equal to a length (er) of the roller in an axial direction and greater than or equal to half the length (er) of the roller in the axial direction.

11. The roller bearing according to claim 9, wherein an axial distance (es) between an end of the lower base and an end of the roller is less than or equal to 10% of a length (er) of the roller in an axial direction.

12. The roller bearing according to claim 9, wherein an arc-shaped recessed portion fitting the bottom of the optical fiber cable is provided at a position in the lower base where the optical fiber cable is arranged.

13. The roller bearing according to claim 9, wherein the lower base is located radially outside of a bolt hole for fixing the outer ring.

14. The roller bearing according to claim 9, further including:
   a cover, the cover having a cross section in the shape of a rectangle, wherein the rectangle forming the cover has a width (cw) greater than or equal to a length (gub) of the upper base of the isosceles trapezoid, and a height (ch) greater than a difference between a height (gh) of the isosceles trapezoid and a diameter (d) of the optical fiber cable, and the cover is inserted into the groove to cover the groove.

15. The roller bearing according to claim 14, wherein the height (ch) of the cover is equal to the height (gh) of the isosceles trapezoid.

16. A wind turbine including a roller bearing according to claim 9.

17. The roller bearing according to claim 9,
   wherein the outer ring is a split outer ring and/or the inner ring is a split inner ring, and
   wherein the roller bearing is a double-row tapered roller bearing in an X arrangement.

18. The roller bearing according to claim 9,
   including a control and storage unit configured to measure and store a load profile if temperature, vibration or speed exceeds a threshold, and to measure and store at least one of the temperature, the vibration, the speed, and the load.

* * * * *